(12) United States Patent
Oda et al.

(10) Patent No.: US 7,736,785 B2
(45) Date of Patent: Jun. 15, 2010

(54) FUEL CELL

(75) Inventors: Masaru Oda, Utsunomiya (JP);
Masahiro Mohri, Utsunomiya (JP);
Hiroaki Ohta, Utsunomiya (JP);
Yasuhiro Watanabe, Kawaguchi (JP);
Satoshi Tanimoto, Utsunomiya (JP);
Nobuhiro Saito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/126,523

(22) Filed: May 23, 2008

(65) Prior Publication Data

US 2008/0292941 A1 Nov. 27, 2008

(30) Foreign Application Priority Data

May 24, 2007 (JP) .............................. 2007-137334

(51) Int. Cl.
*H01M 2/18* (2006.01)
*H01M 2/00* (2006.01)
*H01M 2/14* (2006.01)
*H01M 8/00* (2006.01)

(52) U.S. Cl. .............................. 429/34; 429/12; 429/27
(58) Field of Classification Search .................. 423/12, 423/34
See application file for complete search history.

(56) References Cited

U.S. PATENT DOCUMENTS

2005/0255364 A1* 11/2005 Cho et al. ...................... 429/38

2007/0009779 A1* 1/2007 Mohri et al. .................. 429/34

FOREIGN PATENT DOCUMENTS

| EP | 1378953 A1 | 1/2004 |
|----|------------|--------|
| JP | 06-140056 | 5/1994 |
| JP | 2005-166605 | 6/2005 |
| WO | WO-03/081703 A2 | 10/2003 |
| WO | WO-03/081703 A3 | 10/2003 |

OTHER PUBLICATIONS

European Office Action for Application No. 08009413.9, dated Aug. 21, 2008.

* cited by examiner

*Primary Examiner*—Jerry Lorengo
*Assistant Examiner*—Joseph V Micali
(74) *Attorney, Agent, or Firm*—Lahive & Cockfield, LLP; Anthony A. Laurentano, Esq.

(57) ABSTRACT

An oxygen-containing gas supply passage and an oxygen-containing gas discharge passage extend through a set of diagonal positions of a first metal separator, and a fuel gas supply passage and a fuel gas discharge passage extend through the other set of diagonal positions of the first metal separator. A fuel gas flow field is connected to the fuel gas supply passage through an inlet buffer at an upper position, and connected to the fuel gas discharge passage through an outlet buffer at a lower position. The inlet buffer includes a first inlet buffer area adjacent to the fuel gas supply passage and a second inlet buffer area adjacent to the fuel gas flow field. Grooves of the first inlet buffer area are deeper than grooves of the second inlet buffer area in the stacking direction.

8 Claims, 5 Drawing Sheets

FUEL CELL

BACKGROUND OF THE INVENTION

1. Field of the Invention

The present invention relates to a fuel cell formed by stacking a membrane electrode assembly and a separator in a stacking direction. The membrane electrode assembly includes a pair of electrodes, and an electrolyte interposed between the electrodes. A reactant flow field is formed in the fuel cell for supplying a reactant gas along an electrode surface.

2. Description of the Related Art

For example, a solid polymer electrolyte fuel cell employs a membrane electrode assembly (electrolyte electrode assembly) which includes an anode, a cathode, and a solid polymer electrolyte membrane interposed between the anode and the cathode. The electrolyte membrane is a polymer ion exchange membrane. The membrane electrode assembly is sandwiched between separators to form a power generation cell (unit cell). In use on a vehicle, several tens to hundreds of the unit cells are stacked together to form a fuel cell stack.

In the fuel cell, so called the internal manifold structure is often adopted for supplying a fuel gas and an oxygen-containing gas as reactant gases to an anode and a cathode of each of the stacked power generation cells. The internal manifold includes reactant gas supply passages and reactant gas discharge passages extending through the power generation cells in the stacking direction. Inlets and outlets of reactant gas flow fields for supplying reactant gases along electrode surfaces are connected to the reactant gas supply passages and the reactant gas discharge passages, respectively.

Figure 5:
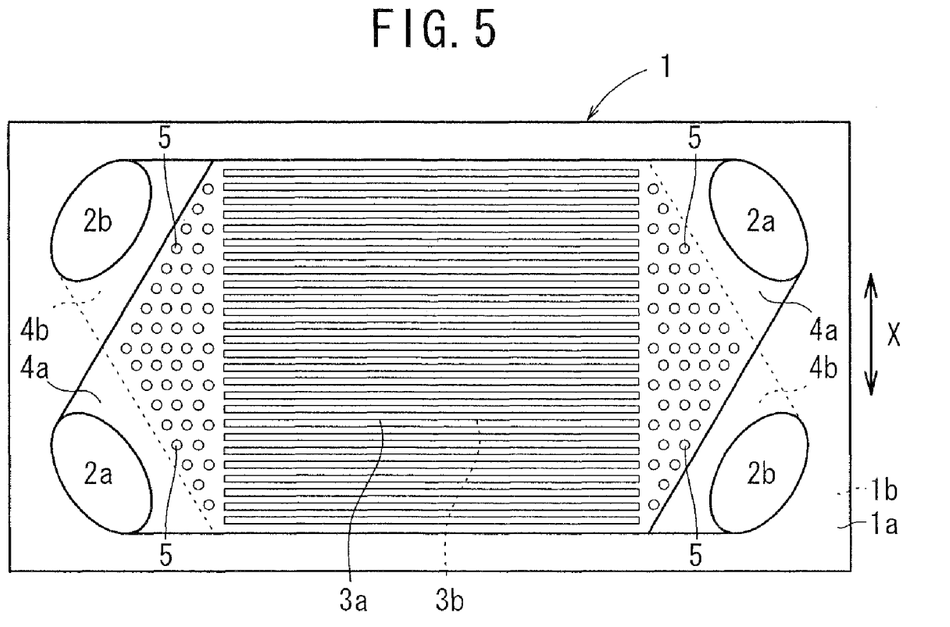
FIG. 5 is a view showing a conventional fuel cell.

In the structure, the opening areas of the reactant gas supply passages and the reactant gas discharge passages are relatively small. Therefore, in order to allow the reactant gases to flow smoothly, buffers for dispersing the reactant gases need to be required adjacent to the reactant gas supply passages and the reactant gas discharge passages. For example, in a solid electrolyte fuel cell disclosed in Japanese Laid-Open Patent Publication No. 06-140056, a separator 1 as shown in FIG. 5 is provided.

Supply/discharge holes 2a as passages of one of the reactant gases and supply/discharge holes 2b as passages of the other of the reactant gases are provided along diagonal lines, at four corners of the separator 1. Ridges and grooves are provided alternately on a surface 1a of the separator 1 to form a reactant gas flow field 3a. Likewise, a reactant gas flow field 3b is formed on a surface 1b of the separator 1.

On the surface 1a of the separator 1, the supply/discharge holes 2a and the reactant gas flow field 3a are connected through gas distribution channels (buffers) 4a, and a plurality of current collectors 5 are provided in the gas distribution channels 4a. On the surface 1b, gas distribution channels 4b connecting the supply/discharge holes 2b and the reactant gas flow field 3b are formed, and a plurality of current collectors 5 are provided in the gas distribution channels 4b.

In the conventional technique, the diameter in each opening of the supply/discharge holes 2a is significantly small in comparison with the width of the reactant gas flow field 3a (in the direction indicated by the arrow X). Thus, it is not possible to uniformly supply the reactant gas through the gas distribution channels 4a along the width of the reactant gas flow field 3a.

In the structure, in some locations in the power generation area of the reactant gas flow field 3a, the flow rate of the reactant gas tends to be small. Thus, when the load is small, power generation cannot be performed stably due to the water remaining in the fuel cell. When the load is large, concentration overpotential occurs due to shortage of the reactant gas, and the desired power generation cannot be achieved.

SUMMARY OF THE INVENTION

A main object of the present invention is to provide a fuel cell having simple structure in which it is possible to uniformly and reliably supply a reactant gas from a reactant gas passage to the entire reactant gas flow field through a buffer, and maintain the suitable power generation performance.

The present invention relates to a fuel cell formed by stacking a membrane electrode assembly and a separator in a stacking direction. The membrane electrode assembly includes a pair of electrodes, and an electrolyte membrane interposed between the electrodes. A reactant flow field is formed in the fuel cell for supplying a reactant gas along an electrode surface.

A reactant gas passage extends through the separator for flowing the reactant gas in the stacking direction. A buffer connecting the reactant gas passage and the reactant gas flow field is formed in the separator. The buffer includes a first buffer area adjacent to the reactant gas passage, and a second buffer area adjacent to the reactant gas flow field. Grooves of the first buffer area are deeper than grooves of the second buffer area in the stacking direction.

Further, the present invention relates to a fuel cell formed by stacking a membrane electrode assembly and a separator in a stacking direction, and in the fuel cell, the membrane electrode assembly includes a pair of electrodes, and an electrolyte membrane interposed between the electrodes, a first reactant gas flow field is formed in the fuel cell for supplying a first reactant gas along one of electrode surfaces, and a second reactant gas flow field is formed in the fuel cell for supplying a second reactant gas along the other of the electrode surfaces.

A first reactant gas supply passage and a first reactant gas discharge passage extend through the separator at one set of diagonal positions for flowing the first reactant gas in the stacking direction, and a second reactant gas supply passage and a second reactant gas discharge passage extend through the separator at the other set of diagonal positions for flowing the second reactant gas in the stacking direction.

An inlet buffer for at least connecting the first reactant gas supply passage and the first reactant gas flow field is formed on one surface of the separator. The inlet buffer includes a first inlet buffer area adjacent to the first reactant gas supply passage, and a second inlet buffer area adjacent to the first reactant gas flow field. Grooves of the first inlet buffer area are deeper than grooves of the second inlet buffer area in the stacking direction.

According to the present invention, the grooves of the first buffer area adjacent to the reactant gas passage are deeper than the grooves of the second buffer area adjacent to the reactant gas flow field in the stacking direction. Thus, in the structure, for example, the reactant gas supplied from the reactant gas passage to the first buffer area is distributed uniformly over the first buffer area. Even if the width of the opening of the reactant gas passage is small, by the first buffer area having the deep grooves near the reactant gas passage, in effect, the width of the opening of the reactant gas passage becomes large. Accordingly, the reactant gas can be supplied uniformly and reliably from the reactant gas passage to the entire reactant gas flow field through the buffer.

The grooves of the second buffer area adjacent to the reactant gas flow field are shallower than the grooves of the first buffer area. Thus, in the structure, for example, at the time of forming the other reactant gas flow field on the back surface of the reactant gas flow field, the depth of the grooves in the buffer area in the other reactant gas flow field can be sufficient.

Accordingly, variation in power generation due to decrease in the flow rate of the fuel gas, and generation of the concentration overpotential is prevented reliably, and the desired power generation performance is achieved stably.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
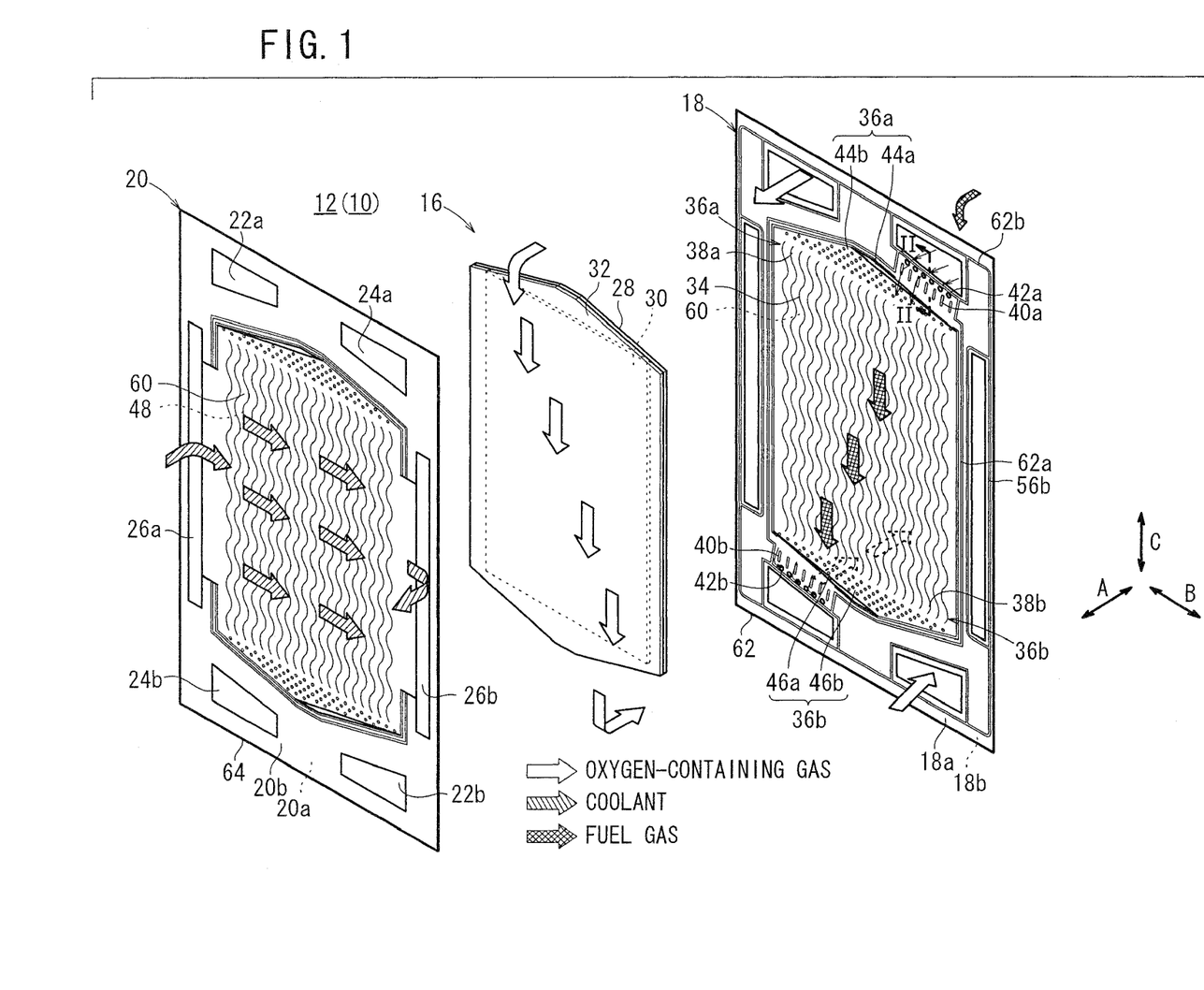
FIG. 1 is an exploded perspective view schematically showing a power generation cell of a fuel cell according to an embodiment of the present invention.
Figure 2:
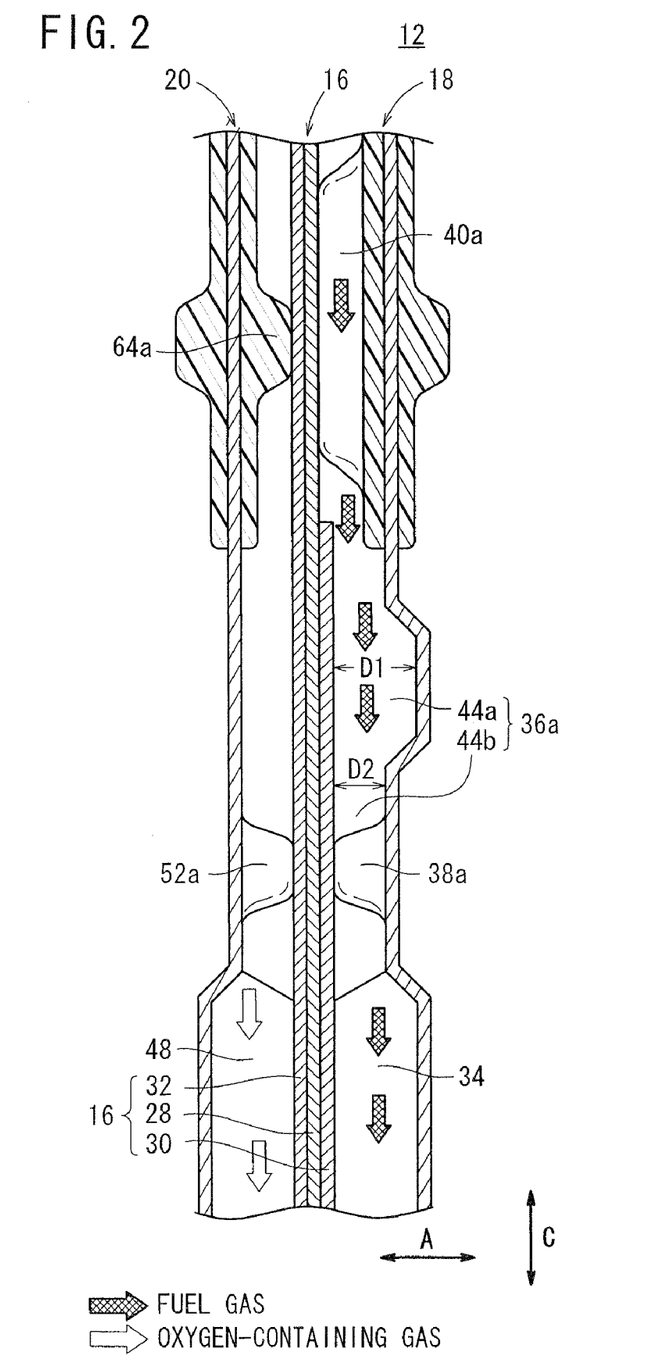
FIG. 2 is a cross sectional view taken along a line II-II in FIG. 1, showing the power generation cell.

FIG. 1 is an exploded perspective view schematically showing a power generation cell 12 of a fuel cell 10 according to an embodiment of the present invention. FIG. 2 is a cross sectional view taken along a line II-II in FIG. 1, showing the power generation cell 12.

The fuel cell 10 is formed by stacking a plurality of the power generation cells 12 in a direction indicated by an arrow A. At opposite ends of the fuel cell 10 in the stacking direction, end plates (not shown) are provided. The stacked power generation cells 12 between the end plates are fixed together by tie rods (not shown). Alternatively, the power generation cells 12 are placed in a casing (not shown), and a predetermined tightening load is applied to the power generation cells 12 in the direction indicated by the arrow A.

As shown in FIG. 1, each of the power generation cells 12 includes a membrane electrode assembly 16 and an anode side first metal separator 18 and a cathode side second metal separator 20 sandwiching the membrane electrode assembly 16. The first metal separator 18 and the second metal separator 20 have ridges and grooves in cross section by corrugating metal thin plates under pressure.

For example, the first metal separator 18 and the second metal separator 20 are steel plates, stainless steel plates, aluminum plates, plated steel sheets, or metal plates having anti-corrosive surfaces by surface treatment. Instead of the first metal separator 18 and the second metal separator 20, for example, carbon separators may be used.

At an upper end of the power generation cell 12 in a longitudinal direction indicated by an arrow C in FIG. 1, an oxygen-containing gas supply passage (reactant gas passage) 22a for supplying an oxygen-containing gas and a fuel gas supply passage (reactant gas passage) 24a for supplying a fuel gas such as a hydrogen-containing gas are provided. The oxygen-containing gas supply passage 22a and the fuel gas supply passage 24a extend through the power generation cell 12 in the direction indicated by the arrow A.

At a lower end of the power generation cell 12 in the longitudinal direction, a fuel gas discharge passage (reactant gas passage) 24b for discharging the fuel gas and an oxygen-containing gas discharge passage (reactant gas passage) 22b for discharging the oxygen-containing gas are provided. The fuel gas discharge passage 24b and the oxygen-containing gas discharge passage 22b extend through the power generation cell 12 in the direction indicated by the arrow A. The oxygen-containing gas supply passage 22a and the oxygen-containing gas discharge passage 22b extend through one set of diagonal positions of the power generation cell 12, and the fuel gas supply passage 24a and the fuel gas discharge passage 24b extend through the other set of diagonal positions of the power generation cell 12.

At one end of the power generation cell 12 in a lateral direction indicated by an arrow B, a coolant supply passage 26a for supplying a coolant is provided. At the other end of the power generation cell 12 in the lateral direction, a coolant discharge passage 26b for discharging the coolant is provided. The coolant supply passage 26a and the coolant discharge passage 26b extend through the power generation cell 12 in the direction indicated by the arrow A.

The membrane electrode assembly 16 includes an anode 30, a cathode 32, and a solid polymer electrolyte membrane 28 interposed between the anode 30 and the cathode 32. The solid polymer electrolyte membrane 28 is formed by impregnating a thin membrane of perfluorosulfonic acid with water, for example. In the embodiment, the surface area of the anode 30 is smaller than the surface area of the cathode 32. However, the present invention is not limited in this respect. The surface area of the anode 30 may be the same as the surface area of the cathode 32.

Each of the anode 30 and the cathode 32 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 30 and the electrode catalyst layer of the cathode 32 are fixed to both surfaces of the solid polymer electrolyte membrane 28, respectively.

Figure 3:
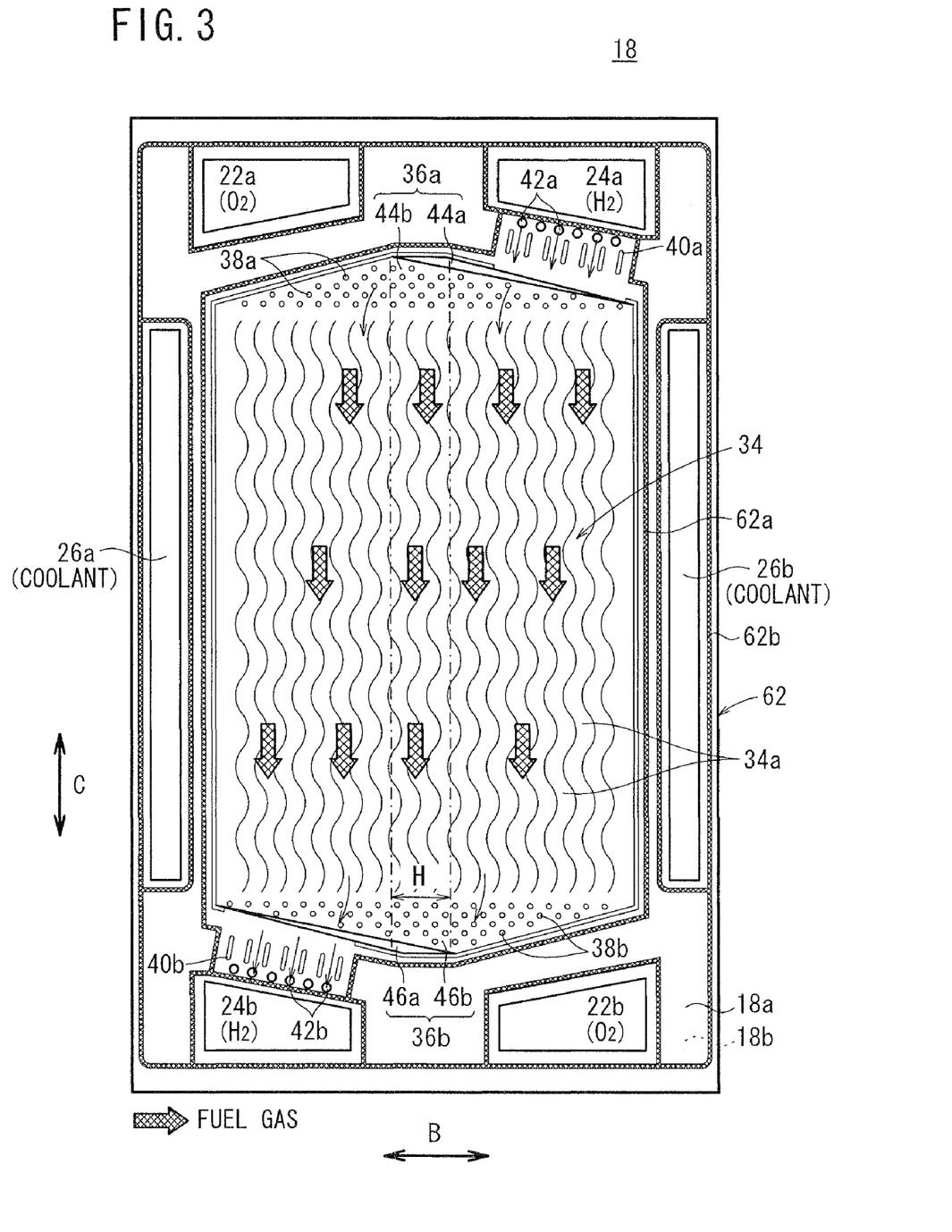
FIG. 3 is a front view showing a first metal separator of the fuel cell.

The first metal separator 18 has a fuel gas flow field 34 on its surface 18a facing the membrane electrode assembly 16. The fuel gas flow field 34 is connected between the fuel gas supply passage 24a and the fuel gas discharge passage 24b. As shown in FIG. 3, the fuel gas flow field 34 has a plurality of corrugated flow grooves 34a extending in a direction indicated by an arrow C. An inlet buffer 36a and an outlet buffer 36b are provided at upper and lower ends of the corrugated flow grooves 34a in the direction indicated by the arrow C. The inlet buffer 36a and the outlet buffer 36b include a plurality of bosses 38a, 38b.

A plurality of receivers 40a and a plurality of receivers 40b are provided on the surface 18a of the first metal separator 18. The receivers 40a form a connection channel connecting the fuel gas supply passage 24a and the inlet buffer 36a having a substantially triangular shape. The receivers 40b form a connection channel connecting the fuel gas discharge passage 24b and the outlet buffer 36b having a substantially triangular shape. A plurality of supply holes 42a and a plurality of discharge holes 42b are provided adjacent to the receivers 40a, 40b, respectively. The supply holes 42a are connected to the fuel gas supply passage 24a on the surface 18b, and likewise, the discharge holes 42b are connected to the fuel gas discharge passage 24b on the surface 18b.

The inlet buffer 36a includes a substantially rectangular first inlet buffer area 44a adjacent to the fuel gas supply passage 24a, and a second inlet buffer area 44b adjacent to the fuel gas flow field 34. As shown in FIG. 2, the depth D1 of the first inlet buffer area 44a in the stacking direction D1 is larger than the depth D2 of the second inlet buffer area 44b in the stacking direction. That is, grooves of the first inlet buffer area 44a are deep.

The outlet buffer 36b has a structure similar to that of the inlet buffer 36a. As shown in FIG. 3, the outlet buffer 36b includes a substantially rectangular first outlet buffer area 46a adjacent to the fuel gas discharge passage 24b, and a second outlet buffer area 46b adjacent to the fuel gas flow field 34. The depth of the first outlet buffer area 46a is larger than the depth of the second outlet buffer area 46b, in the stacking direction.

The first inlet buffer area 44a extends from one end to substantially the center of the fuel gas flow field 34 in the width direction indicated by the arrow B. The first outlet buffer area 46a extends from the other end to substantially the center of the fuel gas flow field 34 in the width direction.

In the present embodiment, a lapping area H of the first inlet buffer area 44a and the first outlet buffer area 46a is provided at substantially the center in the width direction of the fuel gas flow field 34. By providing the lapping area H, it is possible to increase the flow rate of the fuel gas flowing through the central portion of the fuel gas flow field 34.

Figure 4:
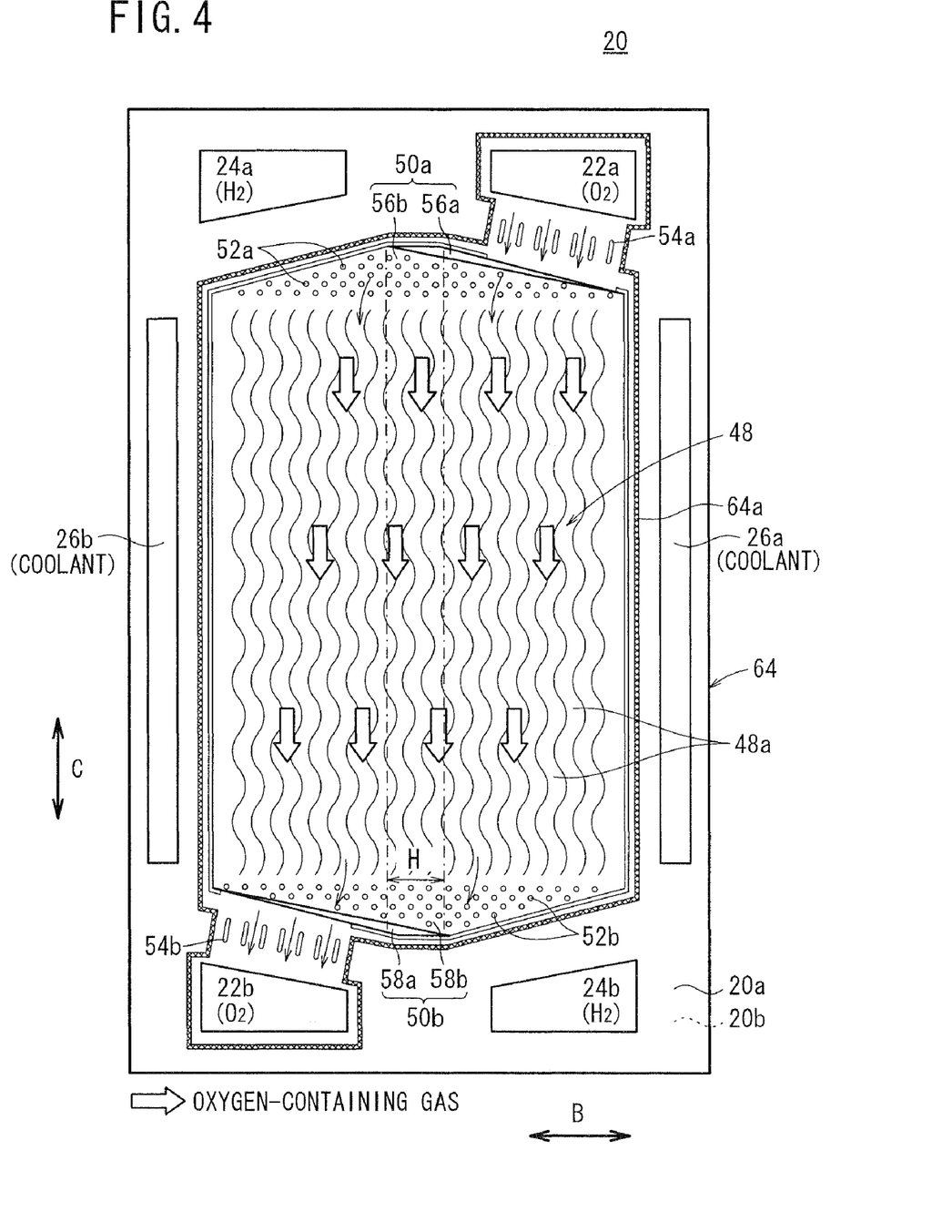
FIG. 4 is a front view showing a second metal separator of the fuel cell.

As shown in FIG. 4, the second metal separator 20 has an oxygen-containing gas flow field 48 on its surface 20a facing the membrane electrode assembly 16. The oxygen-containing gas flow field 48 is connected between the oxygen-containing gas supply passage 22a and the oxygen-containing gas discharge passage 22b. The oxygen-containing gas flow field 48 has a plurality of corrugated flow grooves 48a extending in a direction indicated by the arrow C. An inlet buffer 50a and an outlet buffer 50b are provided at upper and lower ends of the corrugated flow grooves 48a in the direction indicated by the arrow C. The inlet buffer 50a and the outlet buffer 50b include a plurality of bosses 52a, 52b.

A plurality of receivers 54a and a plurality of receivers 54b are provided on the surface 20a of the second metal separator 20. The receivers 54a form a connection channel connecting the oxygen-containing gas supply passage 22a and the inlet buffer 50a, and the receivers 54b form a connection channel connecting the oxygen-containing gas discharge passage 22b and the outlet buffer 50b.

The inlet buffer 50a includes a first inlet buffer area 56a adjacent to the oxygen-containing gas supply passage 22a, and a second inlet buffer area 56b adjacent to the oxygen-containing gas flow field 48. Grooves of the first inlet buffer area 56a are deeper than grooves of the second inlet buffer area 56b in the stacking direction.

Likewise, the outlet buffer 50b includes a first outlet buffer area 58a adjacent to the oxygen-containing gas discharge passage 22b and a second outlet buffer area 58b adjacent to the oxygen-containing gas flow field 48. Grooves of the first outlet buffer area 58a are deeper than grooves of the second outlet buffer area 58b in the stacking direction.

The first inlet buffer area 56a extends from one end to substantially the center of the oxygen-containing gas flow field 48 in the width direction. The first outlet buffer area 58a extends from the other end to substantially the center of the oxygen-containing gas flow field 48 in the width direction. A lapping area H of the first inlet buffer area 56a and the first outlet buffer area 58a is provided at the center in the width direction of the oxygen-containing gas flow field 48.

As shown in FIG. 1, a coolant flow field 60 is formed between the surface 20b of the second metal separator 20 and the surface 18b of the first metal separator 18. The coolant flow field 60 is connected between the coolant supply passage 26a and the coolant discharge passage 26b. That is, the back surface of the fuel gas flow field 34 and the back surface of the oxygen-containing gas flow field 48 are overlapped with each other to form the coolant flow field 60, and the coolant flow field 60 extends in the direction indicated by the arrow B.

A first seal member 62 is provided integrally with the surfaces 18a, 18b of the first metal separator 18, around the outer end of the first metal separator 18. A second seal member 64 is provided integrally with the surfaces 20a, 20b of the second metal separator 20, around the outer end of the second metal separator 20. Each of the first and second seal members 62, 64 is made of seal material, cushion material, or packing material such as an EPDM (ethylene propylene diene monomer) rubber, an NBR (nitrile butadiene rubber), a fluoro rubber, a silicone rubber, a fluorosilicone rubber, a Butyl rubber, a natural rubber, a styrene rubber, a chloroprene rubber, or an acrylic rubber.

As shown in FIGS. 1 and 3, on the surface 18a, the first seal member 62 includes an inner seal 62a provided around the fuel gas flow field 34 and an outer seal 62b provided outside the inner seal 62a.

As shown in FIG. 4, on the surface 20a of the second metal separator 20, the second seal member 64 includes a seal 64a formed around the oxygen-containing gas flow field 48, the inlet buffer 50a, the outlet buffer 50b, the oxygen-containing gas supply passage 22a, and the oxygen-containing gas discharge passage 22b.

Operation of the fuel cell 10 will be described below.

Firstly, as shown in FIG. 1, in the fuel cell 10, an oxygen-containing gas is supplied to the oxygen-containing gas supply passage 22a, and a fuel gas such as a hydrogen-containing gas is supplied to the fuel gas supply passage 24a. Further, a coolant such as pure water or ethylene glycol is supplied to the coolant supply passage 26a. Thus, the oxygen-containing gas, the fuel gas, and the coolant are supplied in the direction indicated by the arrow A, to the power generation cells 12 stacked together in the direction indicated by the arrow A.

The oxygen-containing gas flows from the oxygen-containing gas supply passage 22a to the oxygen-containing gas flow field 48 of the second metal separator 20, and flows along the cathode 32 of the membrane electrode assembly 16 for inducing an electrochemical reaction at the cathode 32.

As shown in FIG. 4, on the surface 20a of the second metal separator 20, the oxygen-containing gas flowing through the oxygen-containing gas supply passage 22a passes through spaces between the receivers 54a, and then, the oxygen-containing gas is supplied to the inlet buffer 50a. The oxygen-containing supplied to the inlet buffer 50a is dispersed in the direction indicated by the arrow B, and flows downwardly along the corrugated flow grooves 48a of the oxygen-containing gas flow field 48, and the oxygen-containing gas is supplied to the cathode 32 of the membrane electrode assembly 16 for inducing an electrochemical reaction at the cathode 32.

As shown in FIGS. 1 and 3, on the surface 18b of the first metal separator 18, the fuel gas flows from the fuel gas supply passage 24a into the supply holes 42a to the surface 18a. The fuel gas passes through spaces between the receivers 40a, and then, the fuel gas is supplied to the inlet buffer 36a. The fuel gas is dispersed in the direction indicated by the arrow B in the inlet buffer 36a and flows downwardly along the corrugated flow grooves 34a of the fuel gas flow field 34. Thus, the fuel gas is supplied to the anode 30 of the membrane electrode assembly 16 for inducing an electrochemical reaction at the anode 30.

Thus, in each of the membrane electrode assemblies 16, the oxygen-containing gas supplied to the cathode 32, and the fuel gas supplied to the anode 30 are consumed in the electrochemical reactions at catalyst layers of the cathode 32 and the anode 30 for generating electricity (see FIG. 2).

As shown in FIG. 4, the oxygen-containing gas consumed at the cathode 32 flows to the outlet buffer 50b connected to a lower portion of the oxygen-containing gas flow field 48. The oxygen-containing gas from the outlet buffer 50b passes through spaces between the receivers 54b, and the oxygen-containing gas is discharged into the oxygen-containing gas discharge passage 22b.

Likewise, as shown in FIGS. 1 and 3, the fuel gas consumed at the anode 30 flows to the outlet buffer 36b connected to a lower portion of the fuel gas flow field 34. The fuel gas passes through spaces between the receivers 40b. Then, the fuel gas flows through the discharge holes 42b to the surface 18b, and the fuel gas is discharged into the fuel gas discharge passage 24b.

Further, after the coolant flows from the coolant supply passage 26a into the coolant flow field 60 between the first and second metal separators 18, 20, the coolant flows in the horizontal direction indicated by the arrow B. After the coolant cools the membrane electrode assembly 16, the coolant is discharged into the coolant discharge passage 26b.

In the present embodiment, as shown in FIG. 3, the inlet buffer 36a includes the first inlet buffer area 44a adjacent to the fuel gas supply passage 24a and the second inlet buffer area 44b adjacent to the fuel gas flow field 34. The grooves of the first inlet buffer area 44a are deeper than the grooves of the second inlet buffer area 44b.

In the structure, the fuel gas from the fuel gas supply passage 24a passes through the spaces between the receivers 40a, and the fuel gas supplied to the first inlet buffer area 44a is distributed uniformly over the entire first inlet buffer area 44a. Thus, after the fuel gas is supplied from the first inlet buffer area 44a to the second inlet buffer area 44b uniformly, the fuel gas is reliably and uniformly supplied to the entire fuel gas flow field 34 in the width direction indicated by the arrow B.

Further, in the present embodiment, the outlet buffer 36b includes the first outlet buffer area 46a adjacent to the fuel gas discharge passage 24b and the second outlet buffer area 46b adjacent to the fuel gas flow field 34. The grooves of the first outlet buffer area 46a are deeper than the grooves of the second outlet buffer area 46b.

The first inlet buffer area 44a and the first outlet buffer area 46a extend from the ends to the substantially center of the fuel gas flow field 34 in the width direction. The predetermined lapping area H is provided at the center. In the structure, in particular, it is possible to increase the flow rate at the substantially center in the width direction of the fuel gas flow field 34 where the flow rate of the fuel gas tends to be decreased.

Thus, in the fuel gas flow field 34, it is possible to ensure that the fuel gas is distributed uniformly over the entire power generation area. Accordingly, variation in power generation due to decrease in the flow rate of the fuel gas, and generation of the concentration overpotential is prevented reliably, and the desired power generation performance is achieved stably.

As shown in FIG. 4, in the oxygen-containing gas flow field 48, as in the case of the fuel gas flow field 34, the inlet buffer 50a and the outlet buffer 50b are provided. The grooves of the first inlet buffer area 56a and the first outlet buffer area 58a are deeper than the grooves of the second inlet buffer area 56b and the second outlet buffer area 58b in the stacking direction. Thus, it is possible to supply the oxygen-containing gas to the entire oxygen-containing gas flow field 48 in the width direction uniformly and smoothly, and the same advantages as in the case of the fuel gas flow field 34 are obtained.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A fuel cell formed by stacking a membrane electrode assembly and a separator in a stacking direction, said membrane electrode assembly including a pair of electrodes, and an electrolyte membrane interposed between said electrodes, a reactant gas flow field being formed in said fuel cell for supplying a reactant gas along an electrode surface, a reactant gas passage extending through said separator for flowing the reactant gas in the stacking direction, a buffer connecting said reactant gas passage and said reactant gas flow field being formed in said separator, said buffer including:

a first buffer area adjacent to said reactant gas passage; and a second buffer area adjacent to said reactant gas flow field, wherein grooves of said first buffer area are deeper than grooves of said second buffer area in the stacking direction.

2. A fuel cell formed by stacking a membrane electrode assembly and a separator in a stacking direction, said membrane electrode assembly including a pair of electrodes, and an electrolyte membrane interposed between said electrodes, a first reactant gas flow field being formed in said fuel cell for supplying a first reactant gas along one of electrode surfaces, a second reactant gas flow field being formed in said fuel cell for supplying a second reactant gas along the other of said electrode surfaces, a first reactant gas supply passage and a first reactant gas discharge passage extending through said separator at one set of diagonal positions for flowing the first reactant gas in the stacking direction, a second reactant gas supply passage and a second reactant gas discharge passage extending through said separator at the other set of diagonal positions for flowing the second reactant gas in the stacking direction, an inlet buffer for at least connecting said first reactant gas supply passage and said first reactant gas flow field being formed on one surface of said separator, said inlet buffer including:

a first inlet buffer area adjacent to said first reactant gas supply passage; and a second inlet buffer area adjacent to said first reactant gas flow field, wherein grooves of said first inlet buffer area are deeper than grooves of said second inlet buffer area in the stacking direction.

3. A fuel cell according to claim 2, wherein an outlet buffer is formed on the one surface of said separator for connecting said first reactant gas discharge passage and said first reactant gas flow field, said outlet buffer including:

a first outlet buffer area adjacent to said first reactant gas discharge passage; and a second outlet buffer area adjacent to said first reactant gas flow field, wherein grooves of said first outlet buffer area are deeper than grooves of said second outlet buffer area in the stacking direction.

4. A fuel cell according to claim 3, wherein said first inlet buffer area extends from one end to substantially the center of said first reactant gas flow field in a width direction;

said first outlet buffer area extends from the other end to substantially the center of said first reactant gas flow field in the width direction.

5. A fuel cell according to claim 4, wherein a lapping area of said first inlet buffer area and said first outlet buffer area is provided at substantially the center of said first reactant gas flow field in the width direction.

6. A fuel cell according to claim 4, wherein said first reactant gas flow field includes a plurality of flow grooves extending in a direction of gravity;

said first inlet buffer area is provided at upper ends of said flow grooves; and said first outlet buffer area is provided at lower ends of said flow grooves.

7. A fuel cell according to claim 1, the fuel cell further comprising a connection channel connecting said reactant gas passage with said buffer, wherein at least a portion of said first buffer area is provided between said connection channel and said second buffer area.

8. A fuel cell according to claim 2, the fuel cell further comprising a connection channel connecting said first reactant gas supply passage with said inlet buffer, wherein at least a portion of said first inlet buffer area is provided between said connection channel and said second inlet buffer area.

* * * * *